(No Model.)
E. W. WOLFE.
PIPE COUPLING.
No. 320,738. Patented June 23, 1885.
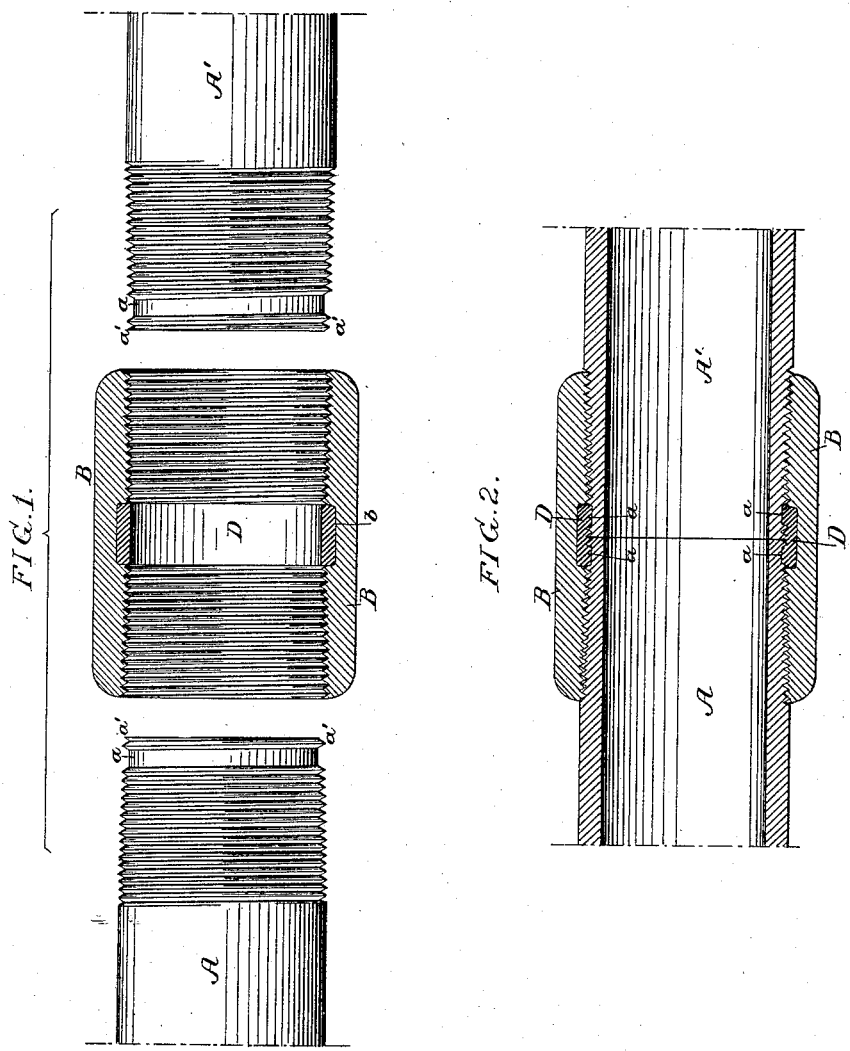
Witnesses:
William F. Davre.
Harry Drury
Inventor:
Edward W. Wolfe
by his Attorneys
Howson & Sons

UNITED STATES PATENT OFFICE.

EDWARD W. WOLFE, OF READING, PENNSYLVANIA, ASSIGNOR TO READING IRON WORKS, OF SAME PLACE.

PIPE-COUPLING.

SPECIFICATION forming part of Letters Patent No. 320,738, dated June 23, 1885.

Application filed May 1, 1885. (No model.)

*To all whom it may concern:*

Be it known that I, EDWARD W. WOLFE, a citizen of the United States, and a resident of Reading, Berks county, Pennsylvania, have invented certain Improvements in Pipe-Couplings, of which the following is a specification.

My invention consists of an improved pipe-coupling for sections of metal pipe; the object of my invention being to make a perfectly fluid-tight joint.

In the accompanying drawings I have shown my improvements as applied to the form of coupling described in the Patent of Morse, No. 263,943, September 5, 1882; but my invention is applicable to other forms of screw-couplings.

Figure 1 is a view illustrating adjoining ends of pipe with the coupling-sleeve shown in section separate; and Fig. 2 is a sectional view showing the coupling when applied.

A and A' are the ends of two pipe-sections to be united, and B is the coupling-sleeve, which has tapering screw-threads and an intermediate interior groove or recess, as described in the said Patent of Morse, No. 263,943, the ends of the pipe-sections having corresponding screw-threads. In my improved coupling these threads are so formed that when they are screwed home into the sleeve, the adjoining ends of the two sections will abut closely, as shown in Fig. 2. I form near the end of each section an annular groove, $a$, leaving one or two threads $a'$ at the extreme end of each pipe.

In the interior of the annular recess $b$ of the sleeve B, I provide a ring or packing, D, of soft metal, into which, as the pipe-sections are screwed home into the coupling, the threads $a$ $a'$ are screwed until the adjoining ends of the pipes meet in the center of the coupling-sleeve, as shown in Fig. 2. I then apply to the exterior of the sleeve, around this soft-metal ring or packing D, a heated metal band or some other equivalent device, which will have the effect of fusing or partially fusing the soft metal D, so that it will run into and effectually close the joints, thus forming a perfectly fluid-tight coupling.

As the ends of the pipe-sections abut against each other, no interior sleeve is needed to prevent the soft metal, when fused, from running into the interior of the pipe.

I claim as my invention—

1. The combination of a threaded coupling-sleeve, having an interior soft-metal packing, with pipe-sections having threaded ends adapted to said sleeve and abutted against each other therein, as set forth.

2. The combination of sections of pipe, having annular grooves $a$ near their ends and screw-threads at the extreme ends, with a threaded coupling-sleeve having an interior soft-metal packing, substantially as described.

3. The combination of pipe-sections, having tapering threaded ends, annular grooves $a$ near their ends, and screw-threads at the extreme ends, with a correspondingly-threaded coupling-sleeve provided with an interior central packing, substantially as set forth.

In testimony whereof I have signed my name to this specification in the presence of two subscribing witnesses.

E. W. WOLFE.

Witnesses:
PHILIP S. ZIEBER,
T. O. YARINGTON, Jr.